US006622182B1

(12) United States Patent
Miller et al.

(10) Patent No.: US 6,622,182 B1
(45) Date of Patent: Sep. 16, 2003

(54) UPSTREAM SITUATED APPARATUS AND METHOD FOR PROVIDING HIGH BANDWIDTH DATA FLOW CONTROL TO AN INPUT/OUTPUT UNIT

(75) Inventors: Steven C. Miller, Livermore; James E. Tornes, Menlo Park, both of CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/409,805

(22) Filed: Sep. 30, 1999

Related U.S. Application Data

(63) Continuation-in-part of application No. 08/716,951, filed on Sep. 8, 1996, now Pat. No. 6,154,794.

(51) Int. Cl.$^7$ .......................... G06F 13/14; G06F 13/20
(52) U.S. Cl. .......................... 710/29; 710/34; 710/48; 710/56; 710/52; 710/59; 709/232; 709/234; 709/235
(58) Field of Search .......................... 710/29, 34, 33, 710/52, 56, 306, 48, 59; 709/232, 234, 235

(56) References Cited

U.S. PATENT DOCUMENTS 5,535,380 A  *  7/1996  Bergkvist, Jr. et al. ..... 395/550
5,737,535 A  *  4/1998  Bagley et al. ......... 395/200.57
5,751,969 A  *  5/1998  Kapoor ................. 395/200.65
5,802,055 A  *  9/1998  Krein et al. ................. 370/402

* cited by examiner

Primary Examiner—Jeffrey Gaffin
Assistant Examiner—Rehana Perveen
(74) Attorney, Agent, or Firm—Baker Botts L.L.P.

(57) ABSTRACT

A method and apparatus for controlling the flow of information (e.g., graphics primitives, display data, etc.) to an input/output unit within a computer controlled graphics system. The system includes a processor having a first-in-first-out (FIFO) buffer, a separate input/output unit with its FIFO buffer, and a number of intermediate devices (with FIFO buffers) coupled between the input/output unit and the processor for moving input/output data from the processor to the input/output unit. Mechanisms are placed within an intermediate device which maintain an accounting of the number of input/output data sent to the input/output unit, but not yet cleared from the input/output unit's buffer. These mechanisms regulate data flow to the input/output unit. The system also includes an efficient return channel to minimizine the amount of data transfer bandwidth required in returning status information on the FIFO buffer of the input/output unit. The system also includes an efficiently invoked timer mechanism for temporarily suspending the processor from transmitting stores to the input/output unit when the input/output unit and/or the intermediate devices are congested. The processor is not interrupted by an interrupt request until after the timer mechanism times out, allowing the system an opportunity to clear its congestion before a lengthily invoked interrupt is required.

20 Claims, 6 Drawing Sheets

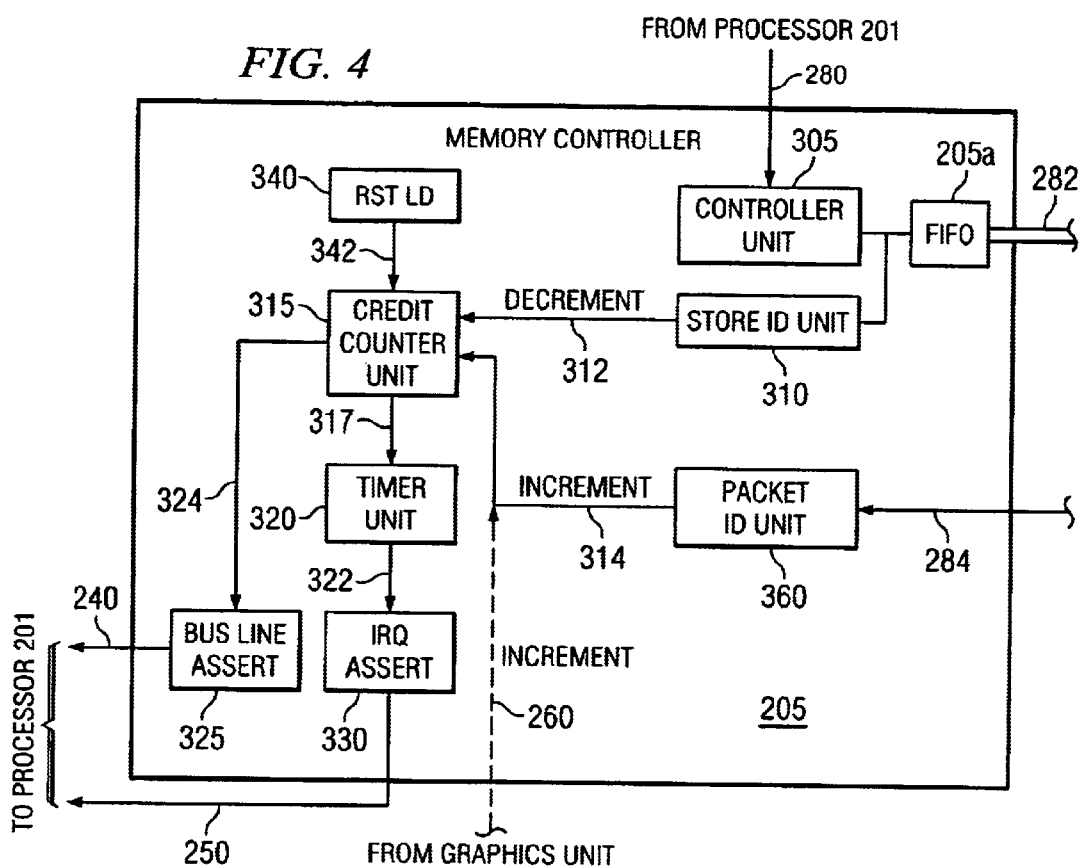
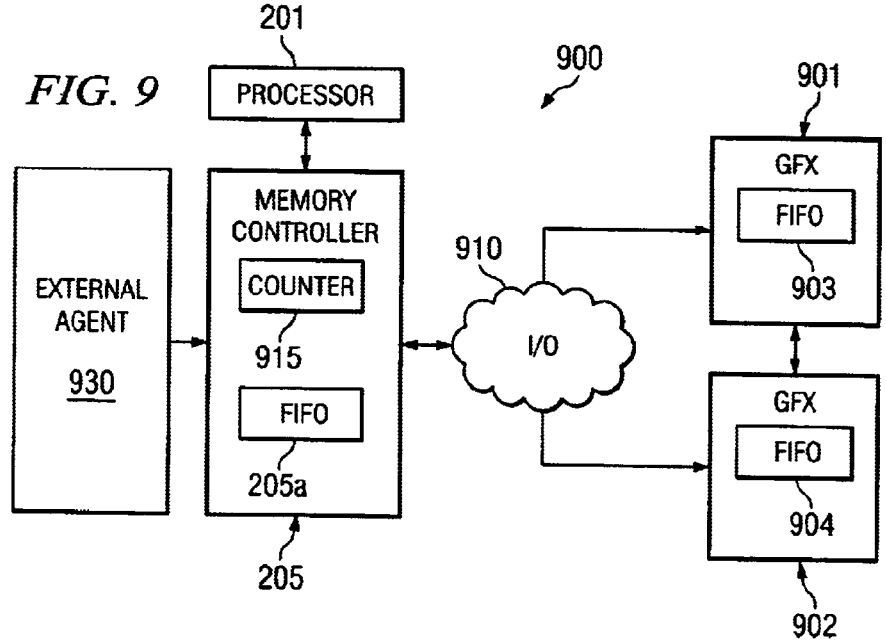

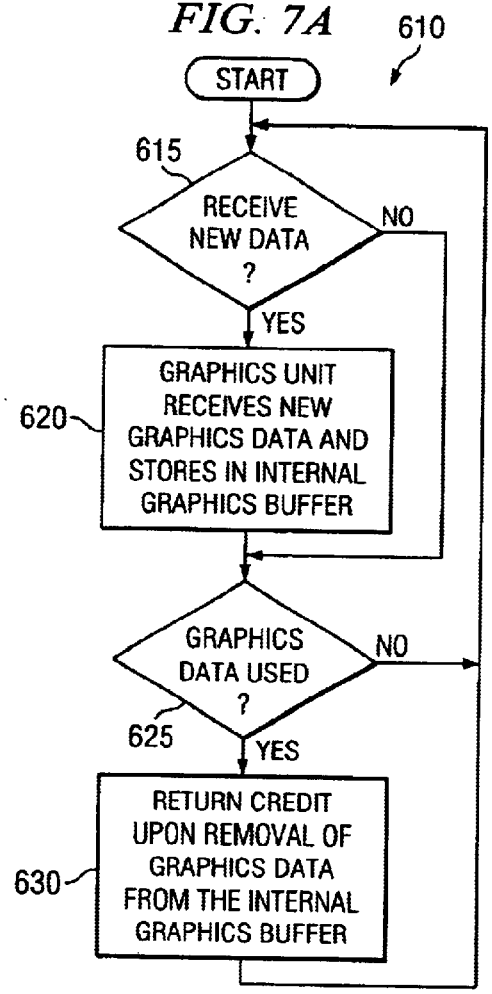
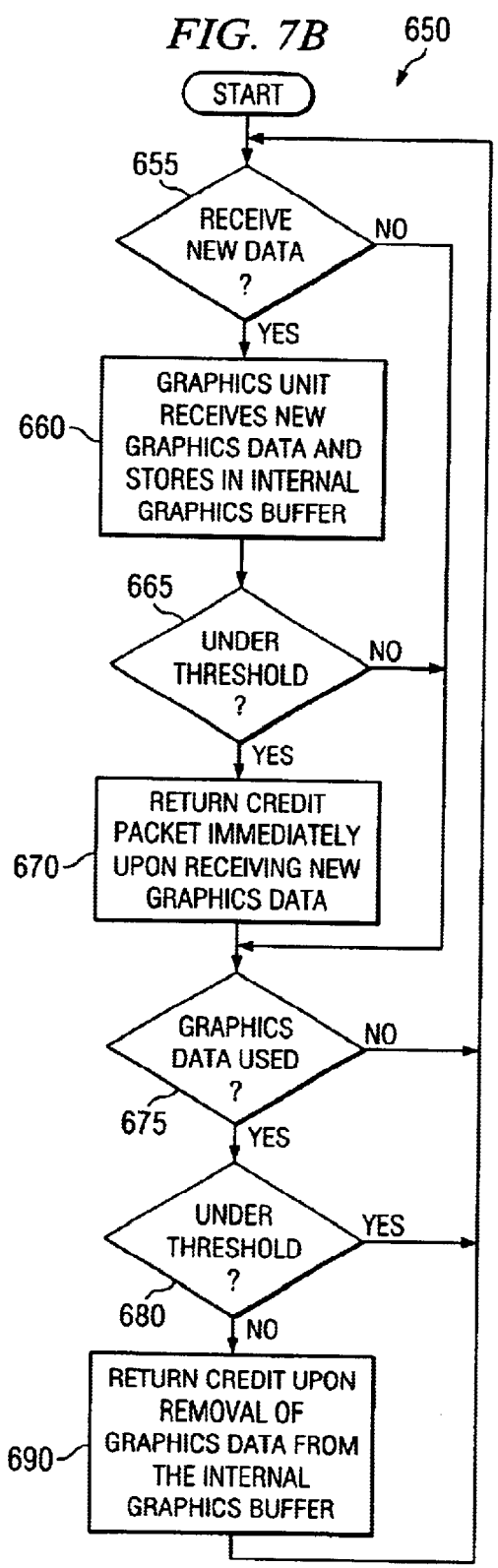
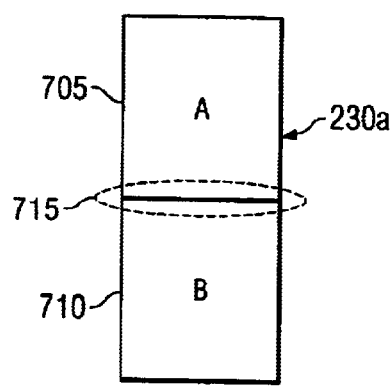

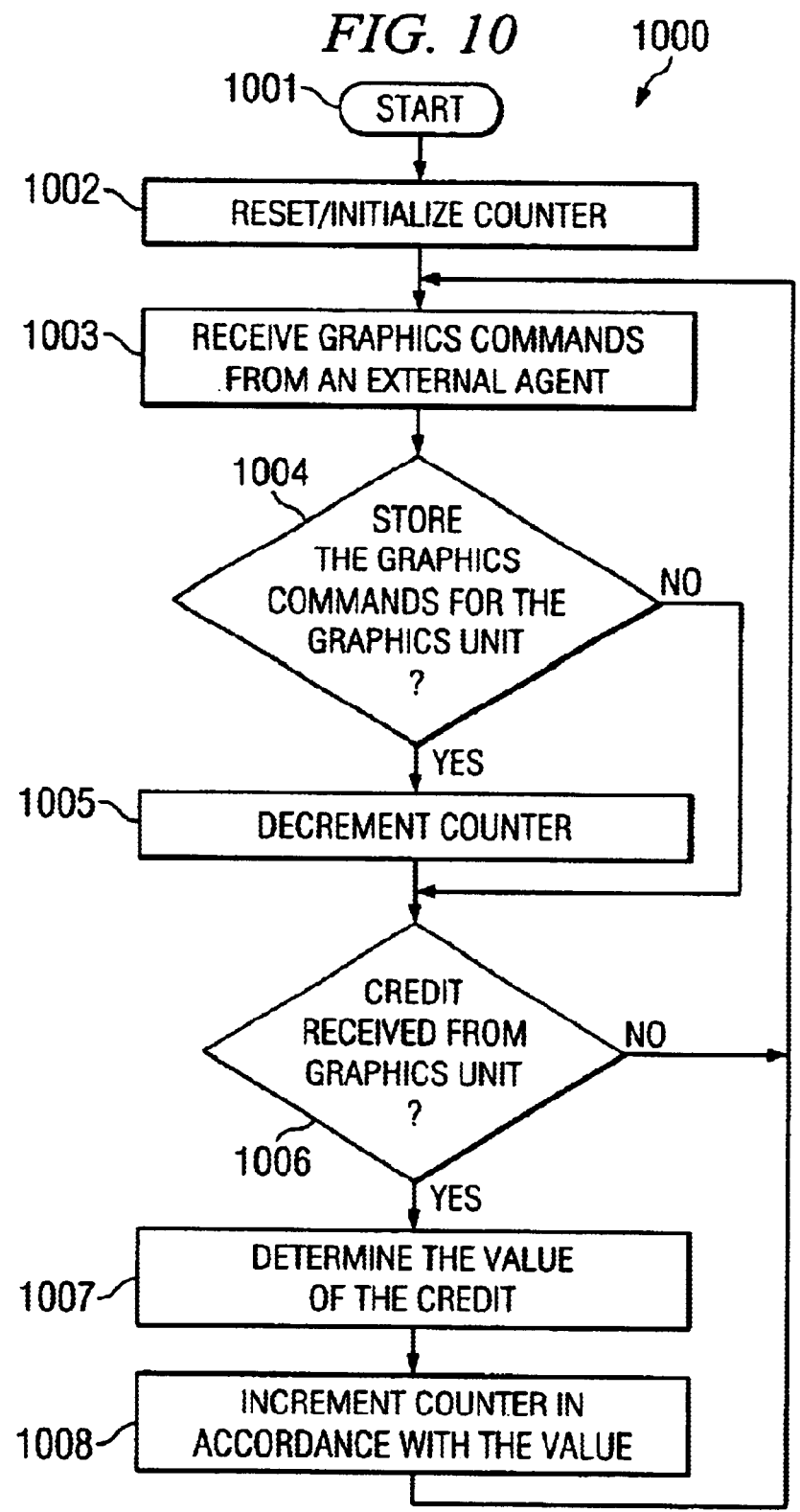

UPSTREAM SITUATED APPARATUS AND METHOD FOR PROVIDING HIGH BANDWIDTH DATA FLOW CONTROL TO AN INPUT/OUTPUT UNIT

This application is a Continuation In Part application based upon U.S. patent application "AN UPSTREAM SITUATED APPARATUS AND METHOD FOR CONTROLLING DATA FLOW TO AN INPUT/OUTPUT UNIT" Ser. No. 08/716,951 filed Sep. 8, 1996 now U.S. Pat. No. 6,154,794 by Abdalla et al.

BACKGROUND OF THE INVENTION

(1) Field of the Invention

The present invention relates to the field of computer controlled input/output systems, e.g., graphic display systems. More specifically, the present invention relates to methods for controlling input/output data flow within an electronic-system.

(2) Prior Art

Traditionally, the distinctive feature of many input/output devices or "input/output units" (e.g., graphics devices) connecting to a host processor has been its random access pattern and its high demand for data. Prior art electronic systems have attempted to facilitate communication of data between a host processor and the input/output unit by placing first-in-first-out (FIFO) buffers within the data transmission path of the input/output data. This is especially true of a graphics unit input/output unit, for example, with respect to graphics data. The buffers function in one way to "smooth" out the input/output data traffic into a more uniform data flow and ease communication interfaces between coupled electronic units. In effect, the buffers provide a temporary storage location for the input/output data so that receiving devices need not be ready to receive input/output data at the same instant that sending devices are ready to send and vice-versa. However, in a graphics environment, these buffers can also create side effects that can reduce a computer controlled graphics system's overall graphics data processing efficiency.

FIG. 1A illustrates an exemplary prior art computer controlled graphics display system 50 that utilizes a buffered communication pathway between the processor and the input/output unit. It is appreciated that a graphics system is exemplary only and that the buffer related problems described herein are also associated with many other more generalized input/output systems. System 50 includes a processor 101 having an internal FIFO buffer 101a coupled to a memory controller 105 which also has an internal FIFO buffer 105a. The memory controller 105 is coupled to a memory unit 102 and also to a data communication bus 100 (which can also contain an internal buffer, not shown). The bus 100 is coupled to a number of optional devices 120 and 122 and also to a graphics unit 1730 which contains an internal FIFO buffer 130a. A dedicated interrupt (IRQ) line 140 is routed from the graphics unit 130 to the memory controller 105. Exemplary sizes of buffers 101a, 105a, and 130a are 128, 256, and 1 k bytes. Assume an internal bus buffer of 512 bytes also exists.

In the configuration of FIG. 1A, the graphics unit 130 contains input/output data flow control circuitry which monitors the level of data contained within its buffer 130a. When the input/output data reaches a certain level, an interrupt is generated by unit 130 over line 140 to inform processor 101 to suspend sending new input/output data until unit 130 can reduce the contents of buffer 130a. The interrupt service routine stops processor 101 from generating more input/output data. When the data level of the buffer 130a is reduced, the invoked interrupt service routine ends and allows processor 101 to resume sending input/output data.

The above input/output data flow control mechanism is problematic due to the number of intermediate buffer devices located between, and including, the processor 101 and the graphics unit 130. These include buffer devices 101a, 105a, and the bus buffer which are all situated between processor 101 and the graphics unit 130. In some prior art systems, additional intermediate buffers can also exist. For instance, the bus 100 can contain multiple buffers, etc. Just after graphics unit 130 generates the buffer full interrupt over line 140, processor 101 suspends generating new input/output data, as discussed above, but any existing input/output data in flight located within each of the above buffers still needs to be moved downstream into the graphics unit 130. Therefore, the graphics unit's buffer 130a is required to have space to accommodate this additional input/output data after the processor interrupt is invoked.

In prior art systems 50, only a relatively small portion of the input/output buffer 130a is allowed to store input/output data until the interrupt is asserted so that buffer space is available to accommodate the in flight input/output data described above. FIG. 1B illustrates this small portion 151 of buffer 130a. Since the graphics unit 130 does not know whether or not the intermediate buffers contain any input/output data, the remainder portion 153 of buffer 130a is reserved empty to accommodate the size of the processor buffer 101a, the memory controller buffer 105a, any other intermediate buffers 155 (e.g., bus buffer), and an extra buffer 157. The extra buffer 157 is needed to accommodate additional input/output data due to processor skid (e.g., the time or number of cycles it takes the processor to react to an interrupt or flow control signal being asserted), communication latencies, and block input/output data transmissions. Therefore, as seen by FIG. 1B, only a relatively small portion 151 of buffer 130a is actually filled with input/output data before a processor interrupt is needed. In one example, only 128 bytes of the 1 k buffer 103a is used until the processor is interrupted.

By reducing the size of buffer portion 151, the number of processor interrupts increases and the overall efficiency of system 50 decreases. Therefore, the performance of system 50 suffers due to a small buffer portion 151. Increased interrupt frequency can also cause image "stuttering" because input/output data flow becomes less uniform. Moreover, since interrupts can be generated in cases where portion 151 is filled, but the intermediate buffers (101a, 105a, bus buffer, etc.) are nevertheless empty, processor 101 can be called upon to enter a lengthy interrupt service routine only to discover that the earlier congestion has since gone away. This again reduces processing efficiency. Since it is not always advantageous to increase the size of buffer 130a due to layout area and cost constraints, what is needed is a system that more efficiently utilizes the amount of buffer storage available within the graphics unit 130. What is further needed is a system that reduces the number of processor interrupts in cases where processor interrupts are not actually warranted.

Accordingly, the present invention provides a computer controlled input/output system that more efficiently controls input/output data flow from a processor to an input/output unit (e.g., a graphics unit). The present invention provides a system that more efficiently utilizes the amount of buffer storage located within an input/output unit before a processor store suspend or interrupt is invoked. Further, the present invention provides a system whereby the number of unnecessary processor interrupts are reduced to increase overall data processing efficiency.

SUMMARY OF THE INVENTION

A method and apparatus are described for controlling the flow of information (e.g., graphics primitives, display data, etc.) to an input/output unit (e.g., a graphics unit) within a computer controlled input/output system (e.g., a graphics display system). The novel system includes a processor having a first-in-first-out (FIFO) buffer, a separate input/output unit (e.g., a graphics unit) having a separate FIFO buffer, and a number of intermediate devices (with FIFO buffers) coupled between the input/output unit and the processor for moving input/output data from the processor to the input/output unit. Mechanisms are placed within an intermediate device, very close to the processor, which maintain an accounting of the number of input/output data forwarded to the input/output unit, but not yet cleared from the input/output unit's buffer. These mechanisms regulate input/output data flow to the input/output unit. By placing these mechanisms close to the processor, rather than within the input/output unit, the novel system allows a larger portion of the input/output unit's buffer to be utilized for storing input/output data before a processor store suspend or processor interrupt is required. This leads to increased input/output data throughput between the processor and the input/output unit by reducing processor interrupts.

The novel system also includes the use of efficient credits to return a value (e.g., from 1 to 255) representative of the number of input/output data processed by the separate input/output unit (e.g., graphics unit). This value is added to the backflow control counter in the coupled devices as appropriate, to keep track of the state of their respective FIFOs. Hence, in accordance with the present embodiment, a single efficient credit can indicate a number of graphics commands (e.g., from 1 to 255). In so doing, the use of such efficient credits greatly reduces the amount of total data transfer bandwidth consumed by the credit return back channel.

The novel system also includes an efficiently invoked timer mechanism for temporarily suspending the processor from transmitting stores to the input/output unit when the input/output unit and/or the intermediate devices are congested. The processor is not interrupted by an interrupt request until after the timer mechanism times out, allowing the system an opportunity to clear its congestion before a lengthy interrupt is required. The above system is particularly useful in conjunction with a graphics input/output unit in a computer controlled graphics display system.

Specifically, embodiments of the present invention include a computer controlled graphics system including an apparatus for controlling flow of input/output data, the apparatus including: a) a processor for generating input/output data, the processor including a processor buffer; b) an input/output unit coupled to receive the input/output data from the processor, the input/output unit for processing the input/output data to render image data, the input/output unit including an internal input/output buffer; and c) a communication bridge coupled between the processor and the input/output unit for transmitting input/output data from the processor to the input/output unit, the communication bridge including a plurality of coupled communication devices wherein individual communication devices contain buffers and wherein a first upstream communication device comprises control circuitry for controlling flow of input/output data from the processor to the input/output unit, the control circuitry including: a counter circuit maintaining a count value, the count value updated upon input/output data sent to the input/output unit from the processor and the count value updated upon credit signals received by the first upstream communication device from the input/output unit, the communication bridge communicating the credit signals; and processor control circuitry for regulating flow of input/output data from the processor to the input/output unit based on the count value of the counter circuit.

BRIEF DESCRIPTION OF THE DRAWINGS

FIG. 4 is a logical block diagram of the input/output data flow control mechanisms in accordance with the present invention.

FIG. 7A illustrates a flow diagram of steps performed by the input/output unit for generating credits to the input/output data flow control mechanisms in accordance with one embodiment of the present invention.

FIG. 7B illustrates a flow diagram of steps performed by the input/output unit for generating credits to the input/output data flow control mechanisms in accordance with another embodiment of the present invention.

FIG. 8 illustrates logical portions of the input/output unit's buffer in accordance with the embodiment of the present invention shown in FIG. 7B.

FIG. 9 is a logical block diagram of a computer controlled input/output data flow control system in accordance with an alternative embodiment of the present invention.

FIG. 10 illustrates a flow diagram of the steps performed by the input/output flow control mechanism of FIG. 9.

DETAILED DESCRIPTION OF THE INVENTION

In the following detailed description of the present invention, an upstream situated apparatus and method for providing high bandwidth data flow control to an input/output unit, numerous specific details are set forth in order to provide a thorough understanding of the present invention. However, it will be obvious to one skilled in the art that the present invention may be practiced without these specific details or with certain alternative equivalent circuits and methods to those described herein. In other instances, well known methods, procedures, components, and circuits have not been described in detail as not to unnecessarily obscure aspects of the present invention.

Figure 2:
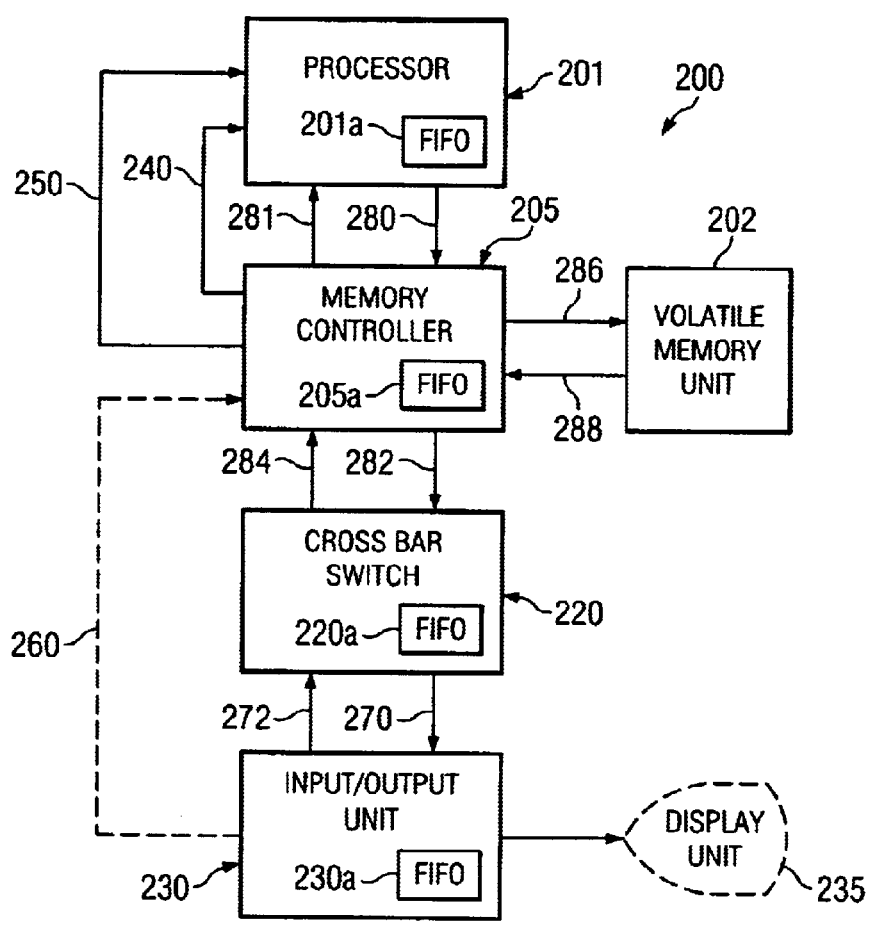
FIG. 2 is a logical block diagram of a computer controlled input/output (e.g., graphics display) system in accordance with the present invention input/output data flow control mechanisms.

FIG. 2 illustrates an exemplary system 200 embodying the present invention input/output data flow control. In one exemplary embodiment of the present invention, system 200 is a computer controlled graphics display system containing a graphics input/output unit having a graphics buffer and processes graphics input/output data. In general, system 200 includes a processor 201 (e.g., a central processing unit) which contains an internal FIFO buffer 201a. The processor is coupled to a memory controller 205 via bus 281 and bus 280 (which can be combined into a single bidirectional bus). It is appreciated that memory controller 205 can also be a processor interface controller within the scope of the present invention. Also coupled between memory controller 205 and processor 201 is a bus line 240 and a processor interrupt line 250, described further below. The above bus lines can be implemented as wires as shown in system 200, or their function can alternatively be implemented with a protocol over the interconnect, 280 and 281, between the processor 201 and the memory controller 205.

Memory controller 205 contains an internal FIFO buffer 205a. As described further below, memory controller 205 is the first upstream device in a sequence of intermediary communication devices (e.g., 205, 220, and their interconnected buses) that bridge communication of input/output data from processor 201 to input/output unit 230. For this reason, in accordance with the present invention, memory controller 205 contains mechanisms for controlling input/output data flow downstream to the input/output unit 230 from processor 201 by maintaining an accounting of the buffer space vacancies within input/output unit 230. By providing the input/output data flow control mechanisms upstream within the flow of input/output data (e.g., close to the processor 201), rather than far downstream within input/output unit 230, the present invention advantageously utilizes a larger percentage of the internal input/output buffer 230a relative the prior art system 50. Further, the present invention reduces the frequency of processor store suspends and processor interrupts due to input/output data transfer congestion within system 200.

With reference to FIG. 2, memory controller 205 is also coupled to volatile memory unit (e.g., random access memory) 202 via a bi-directional bus including portion 286 and 288. In one embodiment, the memory controller 205 is also coupled, via a bi-directional bus comprising portion 284 and 282, to a crossbar switch circuit 220. Crossbar switch circuit 220 contains an internal FIFO buffer 220a and allows multiple point to point communication pathways between multiple coupled devices, including the memory controller 205 and the input/output unit 230.

Figure 1A:
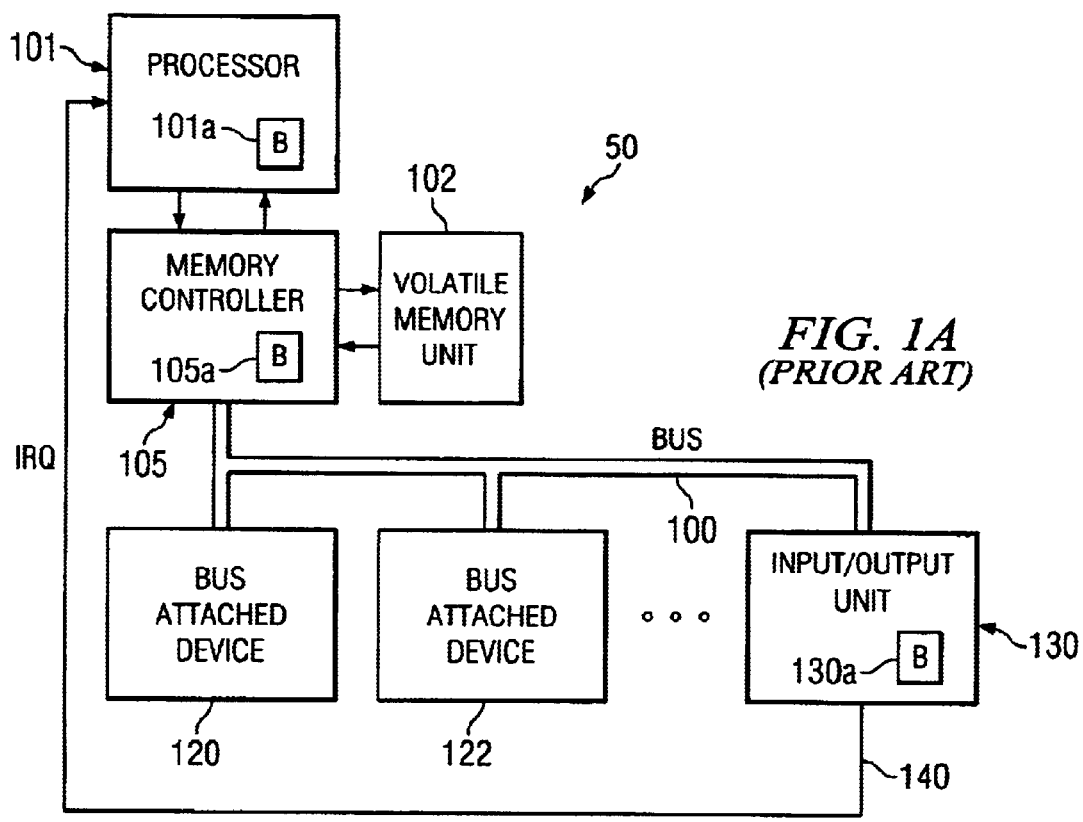
FIG. 1A illustrates a prior art system of input/output (e.g., graphics) data flow monitoring and control.
Figure 1B:
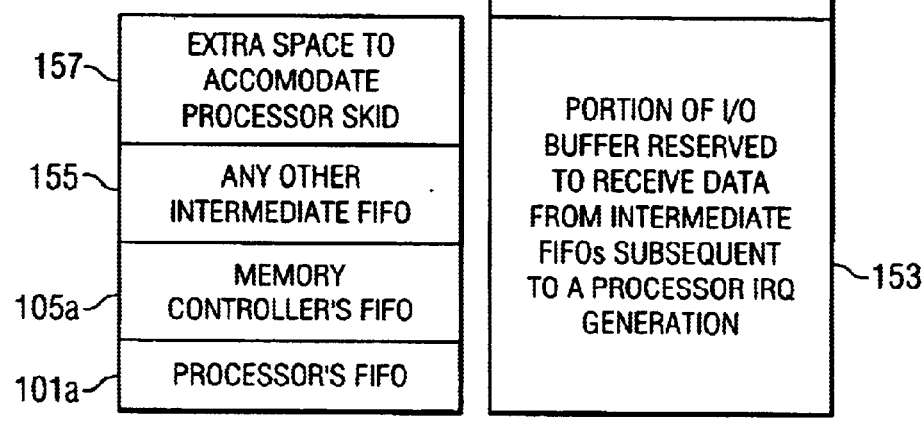
FIG. 1B illustrates portions of a prior art graphics unit buffer.

A communication bridge is formed between processor 201 and input/output unit 230 including buses 281 and 280, memory controller 205, buses 284 and 282, crossbar switch 220, buses 272 and 270, and their respective buffers. It is appreciated that in alternative embodiments of system 200, the communication bridge can contain more than one crossbar circuit 220 coupled between processor 201 and input/output unit 230, or the crossbar circuit 220 can be eliminated completely and replaced with another communication device or bus. Moreover, within the communication bridge of system 200 one or more address/data buses (e.g., of the type analogous to bus 100 of FIG. 1A) can be coupled between processor 201 and input/output unit 230 in addition to, or instead of, crossbar switch 220. The buses described above can also contain their own internal FIFO buffer(s). It is appreciated that the communication bridge of system 200 can accommodate a number of intermediate communication devices that bridge and buffer input/output data between processor 201 and input/output unit 230 and they can be arranged in a number of different configurations. In this regard, the system configuration 200 shown in FIG. 2 is an exemplary configuration.

Input/output unit 230 of FIG. 2 in one embodiment of the present invention is a graphics unit, however, the mechanisms of the present invention are equally well suited for other types input/output units in addition to graphics units. The input/output unit 230 contains an internal FIFO buffer 230a and is coupled to crossbar switch circuit 220 via a bidirectional bus including portion 270 and 272. The one embodiment, the graphics unit 230 receives instructions and graphics data from processor 201 regarding the geometry, texture, color, position, etc., of display images and generates the appropriate image data and signals for rendering the image on a display screen. The internal input/output buffer 230a can be of a variety of sizes within the present invention, e.g., 1 k, 2 k, 4 k, 8 k, etc. Optionally, a display unit (e.g., cathode ray tube or liquid crystal display screen) 235 can be coupled to the input/output unit 230 for visualization of graphics images. In this embodiment, frame buffer memory and rasterization circuitry is also supplied, if not already present within graphics unit 230. Input/output data entering input/output unit 230 is first placed into buffer 230a. In an alternative embodiment, an optional data path 260 can also be provided between input/output unit 230 and the memory controller 205 for carrying credit signals from the input/output unit 230. However, in a preferred embodiment, the credit signals travel as coded packets from the input/output unit 230 to the memory controller 205 via the communication bridge formed by bus 272, crossbar switch 220, and bus 284.

Since the upstream memory controller 205 of the communication bridge performs input/output data flow control within the present invention, the memory controller 205 is able to track the number of individual input/output data within the intermediary buffers, e.g., buffer 205a, 220a, 230a, and any other intermediary bus buffers situated in the communication bridge between processor 201 and input/output unit 230. During periods of input/output data congestion, the memory controller 205 of the present invention signals processor 201 to suspend transmitting data stores to the input/output unit 230. Since the memory controller 205 tracks the number of input/output data in flight within the intermediary buffers or in the input/output buffer 230a, unit 205 is aware at all times of the actual number of input/output data that will be stored into the input/output buffer 230a upon a processor suspend or interrupt being signaled. The only buffer of which memory controller 205 does not know the contents is the processor buffer 201a. Therefore, in accordance with the present invention, buffer 201a is the only buffer for which space needs to be reserved within the input/output buffer 230a after a processor stall or interrupt is generated (aside from processor skid, defined above). As a result, a substantial portion of buffer 230a is utilized within the present invention before a processor suspend or interrupt is required.

Figure 3:
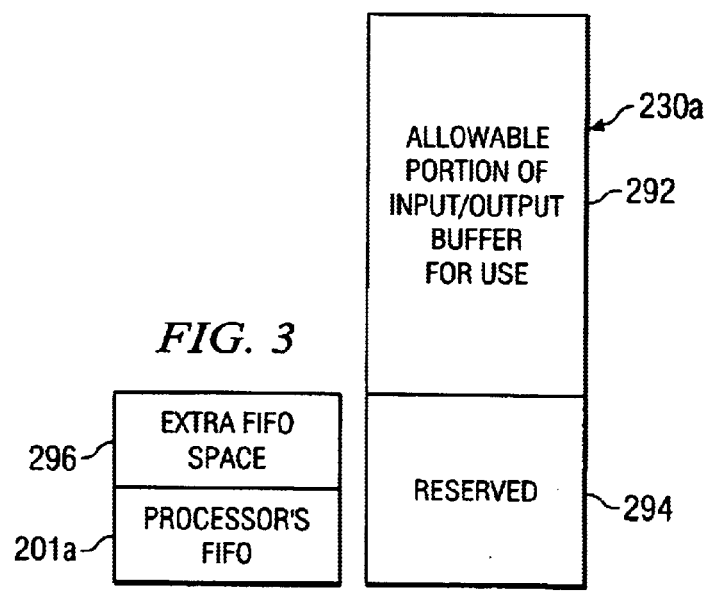
FIG. 3 illustrates portions of the present invention input/output unit buffer.

FIG. 3 illustrates the resulting allowable portion 292 of the input/output buffer 230a that can be used to store input/output data before a processor store suspend or interrupt is required in accordance with the present invention. This portion 292 is generally the entire buffer 230a minus the size of the processor buffer 201a (e.g., 128 bytes or 16 credits). In addition, in one embodiment of the present invention a small amount of space 296 is also needed to account for transmission latencies, processor cache line size (processor skid), and input/output data being sent in blocks. In one implementation, the processor skid of processor 201 is roughly 2.25 cache lines or 36 data credits. As a result, only a relatively small portion 294 of input/output buffer 230a is reserved subsequent to a processor suspend or interrupt, while the large majority 292 does not need to be reserved. This advantageously increases the percentage of input/output buffer 230 that is used relative to the prior art and also reduces the frequency of processor suspends and interrupts, as discussed above.

FIG. 4 illustrates mechanisms in accordance with the present invention located within memory controller 205 for providing "upstream" input/output data flow control within the communication bridge of FIG. 2. In general, memory controller 205 monitors the flow of input/output data from processor 201 to input/output unit 230 and records the numbers of input/output data monitored. In one embodiment, each time an input/output data is removed from the input/output buffer 230a, input/output unit 230 transmits a indication to memory controller 205. In this way, memory controller 205 is aware when the amount of input/output data sent to input/output unit 230 minus the amount removed from buffer 230a, as signaled back from input/output unit 230, equals buffer portion 292. More specifically, a credit counter unit 315 includes a counter circuit which maintains the amount of input/output data sent to input/output unit 230 minus the amount removed from buffer 230a, as signaled back from input/output unit 230 via credits. The processor 201 is able to read the contents of the counter of the credit counter unit 315. In the preferred embodiment, the counter circuit of unit 315 is decremented as stores are sent from processor 201 to input/output unit 230 and is incremented when input/output data is removed from input/output buffer 230a as signaled back from input/output unit 230. However, within the scope of the present invention, an inverse counter maintenance mechanism can also be used whereby. stores increment the counter and credits decrement the counter.

Credit counter unit 315 is coupled to a reset load circuit 340 which, when invoked, loads an initial value within credit counter unit 315 over bus 342. The initial value represents the number of input/output data that can be stored in buffer portion 292 of input/output buffer 230a. Credit counter unit 315 is coupled to a timer unit 320 via a control line 317. When the counter circuit of credit counter unit 315 reaches a zero count, a pulse is transmitted over line 317 which resets a timer unit 320 (e.g., a 26-bit timer value) and starts it counting down a predetermined and very brief time period. The credit counter unit 315 is coupled to a bus line assert circuit 325 via a control bus 324. Simultaneously with the pulse over line 317, a pulse is sent over control bus 324 which causes bus line assert circuit 325 to assert the bus line 240 to processor 201 while the timer unit 320 is counting. The timer unit 320 is coupled to an interrupt request assertion unit (IRQ assert) 330 via control bus 322. Upon a time out of the brief predetermined time period, timer unit 320 generates a pulse over control bus 322 causing IRQ assert unit 330 to assert an interrupt request signal over interrupt line 250 to processor 201.

During the brief predetermined time period, should the credit counter unit receive credits, a signal is sent over control bus 317 to reset timer unit 320 and stop counting, thereby preventing timer unit 320 from timing out. In this case, an unwarranted processor interrupt is avoided according to the present invention.

The memory controller 205 of FIG. 4 also illustrates a controller unit 305 coupled to receive information from processor 201 over bus 280. The controller unit 305 performs well known conventional memory controller features of memory controller 205. The output of the controller unit 305 is fed to FIFO buffer 205a before it is transmitted over bus 282. A store identification unit (store ID unit) 310 is coupled to the output of unit 305 and detects the presence of a store from the processor 201 to the input/output unit 230 over a communication path of the communication bridge. This detection is performed by analyzing the address of the store against known input/output unit addresses. In one embodiment, unit 310 contains a 128K aligned address for recognizing the processor store operations that are intended for the input/output unit 230. In one implementation of the present invention, there are two data sizes, a one input/output data store (e.g., containing 8 bytes each) and a 16 input/output data store (e.g., containing 128 bytes each), each of which are separately identified by the store ID unit 310. The one input/output data store contains a double word of input/output data while the 16 input/output data store contains one cache line of input/output data. Upon receiving a one input/output data store, a signal is sent from unit 310 over bus 312 to decrement the count in credit counter unit 315. If a 16 input/output data store is seen, the decrement pulse is 16.

A data packet identification unit (packet ID unit) 360 of FIG. 4 is also included in a preferred embodiment of the present invention which monitors data over bus 284. In this embodiment, the input/output unit 230 returns credits as data packets over the communication bridge including the crossbar switch 220 and the memory controller 205 (FIG. 2). These packets are then identified by the packet ID unit 360, which monitors a communication path of the communication bridge and generates an increment pulse over bus 314 to increment the count in the credit counter unit 315. In one implementation of the present invention, there are two credit data sizes. If a one data credit is seen, e.g., 8 bytes, the increment pulse over bus 314 is one. If a 16 data credit is seen, e.g., 128 bytes, the increment pulse is 16. In an alternate embodiment of the present invention, an optional direct line 260 is coupled between the input/output unit 230 and the memory controller 205 and the increment pulse signals are directly received from the input/output unit 230.

The bus line 240 is coupled to a dedicated pin of processor 201 and when asserted causes processor 201 to suspend sending stores over bus 280 and stores them into vacancies of FIFO buffer 201a. Upon its internal FIFO buffer 201a filling, the processor 201 becomes stalled while the bus line 240 is asserted. While suspended by bus line 240, no stores are transmitted by processor 201. It is appreciated that by asserting bus lines 240, the present invention provides a mechanism for temporarily suspending processor 201 without requiring a lengthily invoked processor interrupt. Interrupt generation line 250 is also coupled to processor 201 and when invoked causes processor to switch operating contexts, enter an interrupt handling routine, determine the cause of the interrupt, and enter an interrupt service routine which allows the processor 201 to perform other tasks and respond to other interrupts while it suspends the transmission of stores and waits for the input/output data congestion to clear. While so interrupted, other stores can be transmitted from processor 201 aside from stores. Upon the buffers clearing (via processor direct monitoring of the count value of the credit counter unit 315), the interrupt service routines places processor 201 back into the state that existed before the invoked interrupt was received.

Figure 5:
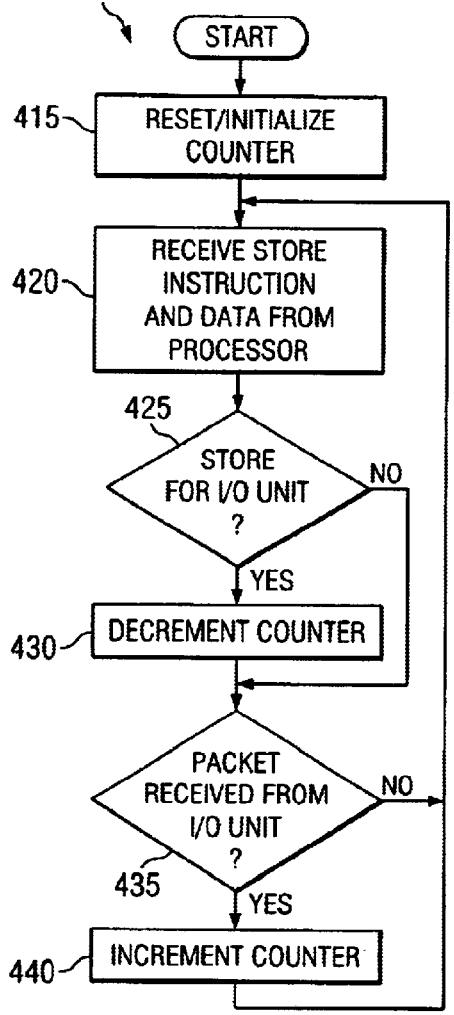
FIG. 5 is a flow diagram of steps of a method for maintaining the data counter of the credit counter unit in accordance with the present invention.

The operation of the present invention is illustrated with respect to steps of FIG. 5 through FIG. 7B. FIG. 5 illustrates process 410 for maintenance of the counter value within the credit counter unit 315. At step 415, at the start of the procedure, the counter of the credit counter unit 315 is loaded with an initial value. In the exemplary embodiment of FIG. 2, the initial value equals the size of the input/output buffer 230a minus a small residual amount to accommodate 2.25 cache lines (e.g., 256 plus 32 bytes) from processor 201, e.g., for processor skid, and the processor FIFO buffer 201a.

At step 420 of FIG. 5, the control unit 305 receives a store from processor 201 and store ID unit 310 interrogates the store. At step 425, the store ID unit 310 determines if the store is destined for the input/output unit 230, or to some other attached unit within system 200. If the store was for the input/output unit 230, step 430 is entered, else step 435 is entered. At step 430, the present invention store ID unit 310 analyzes the store to determine the size of the input/output data, e.g., 1 input/output data or a block of 16 input/output data. Unit 310 then decrements the counter within the credit counter unit 315 by either 1 or 16 depending on the input/output data size. At step 435, the packet ID unit 360 then examines packets received from bus 284 and determines whether or not a credit packet (e.g., 1 or 16 credits) has been received from the input/output unit 230. In an alternate embodiment, at step 435, the credit counter unit 315 checks for pulses over optional line 260 which indicate returned credits (e.g., 1 or 16) from the input/output unit 230. If no credit packets are received in either embodiment, step 420 is entered, otherwise process 410 loops to step 440. At step 440, depending on the input/output data size, a 1 or 16 increment signal is sent over bus 314. Process 410 then loops to step 420.

Figure 6:
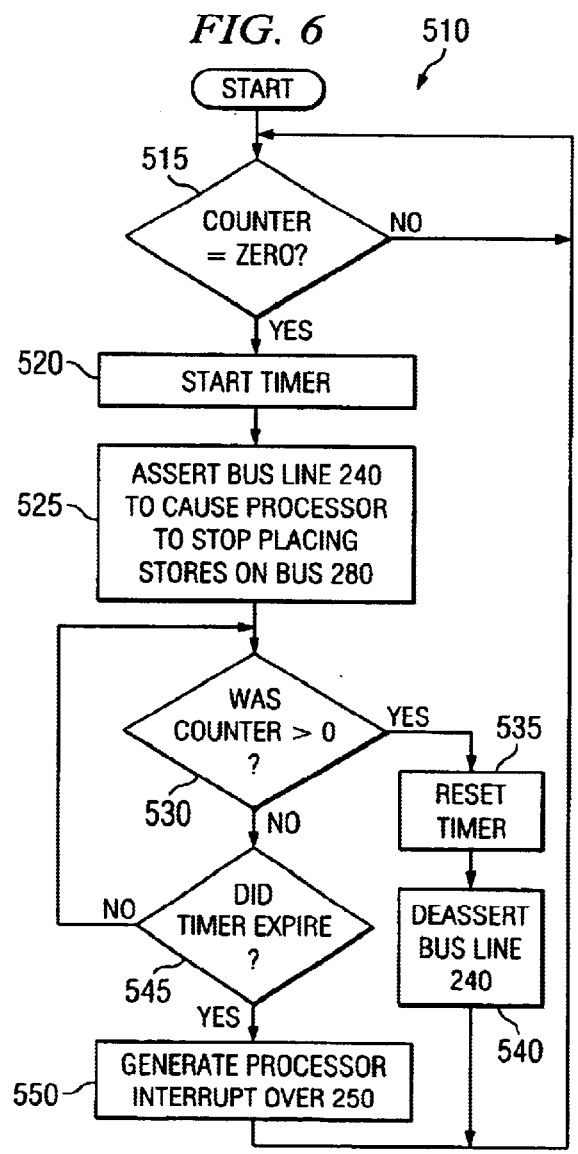
FIG. 6 is a flow diagram of steps of a method for controlling the flow of input/output data in accordance with the present invention method and mechanisms.

FIG. 6 illustrates process 510 of the present invention that operates simultaneously with process 410. At step 515, the credit counter unit 315 checks if the count value it maintains reaches zero, or falls below 16 in one implementation provided input/output data sizes of 16 are allowed. If so step 520 is entered, if not, process 510 loops back to step 515. If the count value is true at step 515, then the input/output buffer 230a is either currently congested or could be congested if all the intermediary buffers (e.g., 201a, 205a, and 220a) emptied their contents into the input/output buffer 230a. At step 520, the credit counter unit 315 signals a pulse over control bus 317 to start a short duration timer within timer unit 320. At step 525, the bus line assert circuit 325 is invoked which applies an assertion signal to bus line 240. This easily and quickly invoked condition causes the processor 201 to temporarily suspend placing any stores onto its bus 280. It is appreciated that the bus line assert signal generated by the bus line assert circuit 325 can also be asserted over bus 281 using a predefined protocol to signal the processor 201, in lieu of dedicated assert line 240. In this case, circuit 325 is directly coupled to communicate the bus line assert signal over bus 281.

The present invention advantageously enters the above condition for a temporary period to accommodate instances where the input/output buffer count of unit 315 quickly becomes decongested after step 515 becomes true. In these instances, it is wasteful to invoke the time consuming and process intensive interrupt service routine when the input/output buffer count would become decongested before the processor's interrupt service routine is even invoked to respond to the congestion. Considering this, the predetermined duration of timer unit 320 (FIG. 4) can be set to approximately the length of time required for processor 201 to enter the interrupt service routine.

At step 530 of FIG. 6, the credit counter unit 315 checks if the credit counter is greater than a predetermined amount (e.g., zero) due to a credit or credits being received within the timer's time period. If so, then the just detected buffer congestion has been eliminated. In this case, the timer unit 320 is reset at step 535 and the bus line 240 becomes deasserted at step 540. When line 240 is deasserted, processor 201 empties its buffer 201a. It is appreciated that the processor store suspend condition invoked and terminated by the bus line 240 is extremely efficient to enter and exit compared to a processor interrupt. By entering the store suspend condition and exiting such condition without an interrupt (e.g., step 540), the present invention effectively avoids the generation of a lengthy processor interrupt when one is not warranted. Process 510 then returns to step 515. At step 530, if a credit was not received, then step 545 is entered where, if the timer unit 320 expires, then step 550 is entered. Otherwise, process 51.0 loops back to step 530. At step 550, the temporary period provided at step 520 was not sufficient to alleviate the buffer congestion. At this stage, a processor interrupt is generated over bus 250 and the bus line 240 is deasserted. By deasserting the bus line 240, the processor 201 is able to drain its buffer 201a, but buffer space is accommodated for this condition by the initial value set within credit counter unit 315.

At this point, the processor 201, switches contexts, enters an interrupt handling routine, examines the type of interrupt and calls the appropriate interrupt service routine which suspends the production of stores to the input/output unit 230, but does allow processor 201 to engage in other useful activity while processor 201 continues to check the count of the credit counter 315. When the count within credit counter 315 increases a predetermined amount above zero, the interrupt service routine exits and process 510 of FIG. 6 returns to step 515. While the processor's interrupt service routine is active, process 410 of FIG. 5 continues normally. The interrupt service routine, while lengthy to invoke, is useful in cases where prolonged periods of data congestion exist (e.g., in the case of a graphics unit, the data can become congested due to screen repaint, screen clear, etc. can take up to 1 ms) because unlike the processor store suspend condition, the interrupt service routine allows processor 201 to generate other useful stores.

According to the above operational flow, stores are only issued to the input/output unit 230 provided credits exist within unit 315. A size field exists in all credit packets sent from the input/output unit 230 indicating the number of credits per packet (e.g., 1 or 16).

FIG. 7A illustrates a preferred process 610 performed by the input/output unit 230 for generating credits back to the memory controller 205. In this embodiment, credits are returned only upon removal from the input/output buffer 230a. At step 615, if new input/output data is received over bus 270 then step 620 is entered, otherwise step 625 is entered. At step 620, the input/output unit 230 stores the new input/output data (e.g., one or 16 input/output data) within internal input/output buffer 230a. At step 625, if input/output data is removed (e.g., used) from the internal input/output buffer 230a then step 630 is entered, otherwise process 610 loops back to step 615. At step 630, in a preferred embodiment of the present invention, input/output unit 230 returns a credit packet over bus 272, through crossbar switch circuit 220, to the memory controller 205. The credit packet indicates the number of data removed from the input/output buffer 230a (e.g., 1 or 16) as a result of step 625. Alternatively, at step 630, a signal can be asserted over optional bus 260 indicating the appropriate number of credits.

FIG. 7B illustrates a process 650 performed by the input/output unit 230 for generating credits back to the memory controller 205 of an alternative embodiment of the present invention having two logical input/output buffers. FIG. 8 illustrates the two logical input/output buffers "A" 705 and "B" 710 which together constitute input/output buffer 230a. The dividing line 715 between portion "A" and portion "B" is set at an internal threshold size. Generally, while portion "B" is empty, credits are returned immediately upon receipt of new input/output data by the input/output unit 230. It is only until portion "A" is completely full that credits are returned only after input/output data is removed from the internal buffer 230a. The size of portion B, and thus the position of the dividing line 715, is such that it can accommodate all intermediate buffers of the communication bridge (e.g., 201a, 205a, 220a, and any bus buffers) plus a small residual amount for processor skid.

At step 655 of FIG. 7B, if the input/output unit 230 receives new input/output data, step 660 is entered, otherwise step 675 is entered. At step 660, the new input/output data is placed into buffer 230a. At step 665, the input/output unit 230 determines if the threshold point of buffer 230a is passed or under. If under, step 670 is entered where a number of credits (e.g., 1 or 16) are returned to the memory controller 205 depending on the number of new input/output data received at step 660. Step 675 is then entered. At step 665, if not under, then at step 675 the input/output unit 230 checks if any input/output data has been removed from buffer 230a. If not, process 650 loops back to step 655. If so, step 680 is entered where input/output unit 230 determines if the threshold point of buffer 230a is passed or under. If under, process 650 loops back to step 655. If past, at step 690, the input/output unit 230 returns a number of credits (e.g., 1 or 16) depending on the number of input/output data that were removed from buffer 230a by step 675. Process 650 then returns to step 655.

It is appreciated that the implementation of FIG. 7B is particularly useful in instances where the internal input/output buffer 230a is relatively large (e.g., over 4K bytes) whereas the implementation of FIG. 7A is useful with more a conservatively sized internal input/output buffer 230a.

According to the above described implementations of the present invention, since more of the internal input/output buffer 230a can be used to store information before a processor suspend or interrupt is required, less processor stalls are required leading to more uniform input/output data flow. Less processor stalls means that processor 201 is able to maintain a greater throughput of sending input/output data to unit 230. Further, by providing an efficiently invoked and exited processor store suspend condition via bus line 240, the present invention is able to avoid interrupting the processor 201 in, instances where such interruption is not warranted. This provides for increased throughput as many unnecessary processor interrupts are avoided.

An additional benefit of the present invention input/output data flow control mechanism is that input/output data is not typically congested or blocked within the crossbar switch 220 because there is room accommodated for this data within buffer 230a which is maintained by credit counter unit 315. Upon a processor stall, there is typically room for the input/output data to flow from the cross bar switch 220 to the input/output unit 230.

Another advantage of the present invention is the elimination of a dedicated interrupt line between the input/output unit 230 and the memory controller 205 or the processor 201. This dedicated line of the prior art is often troublesome to route and particularly problematic when multiple input/output (e.g., graphics) units and multiple processors are involved. The configuration of the interrupt line of the present invention is also beneficial due to its close proximity to the processor 201 which reduces effects of interrupt signal latency.

Referring now to FIG. 9, a high bandwidth packet flow control embodiment of the present invention is shown. As depicted in FIG. 9, the high bandwidth packet flow control system 900 includes CPU 201 coupled to memory controller 205. Memory controller 205 is coupled to two input/output units (e.g., graphics units 901 and 902) via system input/output 910 (e.g., I/O 910). In this embodiment (e.g., system 900), a high bandwidth packet flow control system is implemented between an external agent 930 (e.g., an externally coupled graphics command producing device) and the graphics units 901–902.

As with system 200 of FIG. 2, system 900 processes incoming graphics commands (e.g., from either the external agent 930 or processor 201) in a non-deterministic manner, following a non-deterministic schedule. As with system 200, system 900 includes a set of FIFOs (FIFO 205a in memory controller 205 and FIFOs 903–904) configured to manage the flow of graphics commands between, for example, the external agent 930 and graphics units 901–902. FIFOs 205a and FIFOs 903–904 function in part by buffering the graphics commands as they are transmitted from processor 201 and the external agent 930 (FIFO 205a), and as they are received by graphics units 901–902 (FIFOs 903–904 respectively).

System 900, in a manner similar to system 200 of FIG. 2, uses a credit mechanism, wherein, for example, the external agent 930 maintains a count of graphics commands (Double Word size units in one implementation) which can be stored within the graphics FIFOs 903–904. The count is maintained to prevent the graphics FIFOs 903–904 from overflowing. If FIFOs 903–904 were to overflow, the packets comprising the graphics commands would backup into the system I/O 910. Such a backup into system I/O 910 is detrimental to overall performance in that the backup inhibits packet traffic to any other devices coupled to system I/O 910.

In the present embodiment, FIFO 205a functions with a counter 915 to "throttle" the delivery of packets from coupled devices (e.g., processor 201 and/or the external agent 930). In accordance with the present embodiment, as graphics commands are sent to the FIFO 205a of memory controller 205, counter 915 is decremented. When the "count" maintained by counter 915 indicates an impending overflow, a coupled device, for example processor 201, is prohibited from sending any additional graphics commands to the graphics units 901–902. As described above, processor 201 is able to read the contents (e.g., the count) maintained by counter 915. This prevents any graphics command packets from backing up into system I/O 910.

Referring still to system 900 of FIG. 9, as graphics units 901–902 process commands, they send credit signals (hereinafter "credits") back to processor 201 and the counter is incremented. As with system 200, each credit indicates the processing of a corresponding graphics command and its removal from the respective one of FIFOs 903–904. In the present embodiment, credits travel back to memory controller 205 via the same communication pathways that transmit graphics commands. Hence, a significant portion of the data transfer bandwidth of system 900 is occupied by the transmission of credits from graphics units 901–902.

However, in accordance with the present invention, system 900 minimizes the portion of data transfer bandwidth occupied by the transmission of credits by using an efficient credit packet which contains a variable capable of representing a large number of credits. For example, credits utilized by the System 200 embodiment of FIG. 2 have two return values which match the sent graphics commands (e.g., 1 or 16), and the credits returned do not always match the graphics command format sent, such as where a cache line full of graphics commands are sent but the credits are returned using 16 individual credit packets instead of one. When this happens, the speed of the "return channel" conveying the credits becomes the limiting factor of the overall data transfer bandwidth.

In contrast, the efficient credits used in system 900 return a value from 1 to 255. This value is added to the backflow control counter in the coupled devices (e.g., the external agent 930, processor 201, etc.) as appropriate, to maintain track of the state of the FIFOs 903–904. Hence, in accordance with the present embodiment, a single efficient credit can indicate a number of graphics commands from 1 to 255. Thus, for example to indicate 255 graphics commands have been executed and removed from FIFO 903, a single credit having its variable indicating 255 is sent as opposed to 255 individual credits as would be required in the system 200 embodiment. In so doing, the use of efficient credits as in system 900 greatly reduces the amount of total data transfer bandwidth consumed by the credit return back channel.

As an addition efficiency benefit, in the present embodiment, graphics unit 901 is communicatively coupled to graphics unit 902 such that graphics unit 901 is informed of the state of FIFO 904 within graphics unit 902. This allows graphics unit 901 to return credits representative of the total throughput of both graphics units 901 and 902. In so doing, only graphics unit 901 uses return channel bandwith to return credits to memory controller 205, further reducing the amount of total data transfer bandwidth needed for credit return back channel.

It should be appreciated that while system 900 is depicted with two graphics units 901 and 902, a larger number of graphics units (e.g., 16, 32, etc.) can be similarly implemented.

Referring now to FIG. 10, a flowchart of the steps of a process 1000 in accordance with one embodiment of the present invention is shown. Process 1000 depicts the operating steps of a flow control process as implemented by system 900 of FIG. 9.

Process 1000 begins at step 1002, where the counter of memory controller 205 is loaded with an initial value. In the exemplary embodiment of FIG. 9, the initial value equals the size of the FIFOs 903 and 904 minus a small residual amount (e.g., to accommodate skid, etc.). At step 1003, memory controller 205 receives graphics commands from external agent 930, or processor 201, or some other attached unit within system 900, and forwards them to graphics units 901–902. In step 1004, if graphics units 901–902 store the commands within their internal FIFOs 903–904 for later execution, process 1000 proceeds to step 1005 where the count stored in counter 915 is decremented, else, step 1006 is entered.

Referring still to process At step 1005, the memory controller 205 analyzes the store to determine the size of the graphics commands (e.g., 1 input/output data or a block of 16 input/output data). Memory controller 205 then decrements the count within the counter 915 by either 1 or 16 depending on the graphics command input/output size. At step 1006, the memory controller 205 receives credits back from graphics unit 901 and determines the representative size of the credit received by determining the value of the credit's variable. As described above, in the system 900 embodiment, each returned credit includes a variable capable of representing from 1 to 255 total credits. If no credit is received in step 1006, process 1000 loops back to step 1003, otherwise step 1007 is entered. At step 1007, process 1000 determines the value of the credit received. Subsequently, in step 1008, counter 915 is incremented in accordance with the value. Process 1000 then loops back to step 1003.

The preferred embodiments of the present invention, an upstream situated input/output data flow control mechanism and method, are thus described. While the present invention has been described in particular embodiments, it should be appreciated that the present invention should not be construed as limited by such embodiments, but rather construed according to the below claims.

What is claimed is:

1. An apparatus for controlling flow of input/output data comprising:

a) a processor for transmitting input/output data;
   b) a graphics unit coupled to receive said input/output data from said processor, said graphics unit comprising an internal input/output buffer; and
   c) an input/output system coupled between said processor and said graphics unit for transmitting input/output data from said processor to said graphics unit, said input/output system comprising a plurality of coupled communication devices wherein individual communication devices contain buffers and wherein a first upstream communication device comprises control circuitry for controlling flow of said input/output data from said processor to said graphics unit, said control circuitry comprising:
      a counter circuit maintaining a count value, said count value updated upon input/output data sent to said graphics unit from said processor and said count value updated upon a credit signal received by said first upstream communication device from said graphics unit; and
      a variable included in said credit signal for updating said count value in accordance with a value assigned to said variable.

2. An apparatus as described in claim 1 wherein said graphics unit is for processing said input/output data to render image data and wherein said input/output data comprise graphics data and graphics commands.

3. An apparatus as described in claim 1 wherein said graphics unit generates said credit signal and forwards said credit signal to said first upstream communication device upon input/output data being removed from said input/output buffer, said variable indicating a number of input/output data being removed.

4. An apparatus as described in claim 3 wherein said count value of said counter circuit is incremented upon said credit signal being received by said first upstream communication device from said graphics unit in accordance with said variable of said credit signal, and wherein said count value of said counter circuit is decremented upon input/output data sent to said graphics unit from said processor.

5. An apparatus as described in claim 4 wherein said counter circuit is initially loaded with a count value equal to the size of said input/output buffer minus the size of a processor buffer plus an amount to accommodate processor skid.

6. An apparatus as described in claim 1 wherein said variable of said credit signal has a range of 1 to 255.

7. An apparatus as described in claim 1 wherein said control circuitry further comprises a memory controller.

8. A method for controlling flow of input/output data between a processor and a graphics unit coupled together via a communication bridge, said method comprising the steps of:

a) within a first upstream communication device of said communication bridge, detecting input/output data transmitted from said processor to an input/output buffer of said graphics unit and responsive thereto generating a first count update signal;

b) within said first upstream communication device of said communication bridge, detecting a credit signal transmitted from said graphics unit to said first upstream communication device and responsive thereto generating a second count update signal;

c) maintaining a count value based on said first count update signal and said second count update signal, wherein said second count update signal includes a variable causing said count to update across a range corresponding to the value of said variable; and d) asserting signals to said processor to control flow of said input/output data to said graphics unit based on said count value.

9. A method as described in claim 8 wherein said step d) comprises the steps of:

d1) asserting a bus line signal to said processor causing said processor to temporarily suspend transmitting said input/output data, said step d1) invoked provided said count value reaches a predetermined value;

d2) initiating counting of a predetermined time period provided said count value reaches a predetermined value;

d3) resetting said counting of said time period and deasserting said bus line signal provided a credit signal of said credits signals is received by said first upstream communication device from said graphics unit; and d4) generating a processor interrupt signal causing said processor to temporarily suspend generating said input/output data provided said time period expires.

10. A method as described in claim 8 wherein said step c) comprises the steps of:

c1) decrementing said count value based on said first count update signal; and c2) incrementing said count value based on said variable of said second count update signal.

11. A method as described in claim 8 further comprising the steps of said graphics unit generating and forwarding said credit signal to said first upstream communication device upon input/output data being removed from said input/output buffer.

12. A method as described in claim 8 further comprising the steps of:

said graphics unit generating and forwarding said credit signal to said first upstream communication device immediately upon input/output data being stored into said input/output buffer provided contents of said input/output buffer occupy less than a threshold amount of said input/output buffer; and said graphics unit generating and forwarding said credit signal to said first upstream communication device upon input/output data being removed from said input/output buffer provided contents of said input/output buffer occupy more than a threshold amount of said input/output buffer.

13. A system for controlling flow of input/output data comprising:

a) an external agent for transmitting input/output data;

b) a graphics unit coupled to receive said input/output data from said external agent, said graphics unit comprising an internal input/output buffer; and c) an input/output system coupled between said external agent and said graphics unit for transmitting input/output data from said external agent to said graphics unit, said input/output system comprising a plurality of coupled communication devices wherein individual communication devices contain respective buffers and wherein a first upstream communication device comprises control circuitry for controlling flow of said input/output data from said external agent to said graphics unit, said control circuitry comprising:

a counter circuit maintaining a count value, said count value updated upon input/output data sent to said graphics unit from said external agent and said count value updated upon a credit signal received by said first upstream communication device from said graphics unit;

a variable included in said credit signal for updating said count value in accordance with a value of said variable.

14. A system as described in claim 13 wherein said input/output system includes a crossbar data switch.

15. A system as described in claim 13 wherein said graphics unit is for processing said input/output data to render image data and wherein said input/output data comprise graphics data and graphics commands.

16. A system as described in claim 13 wherein said graphics unit generates said credit signal and forwards said credit signal to said first upstream communication device upon input/output data being removed from said input/output buffer, said count value updated in accordance with said variable included in said credit signal.

17. A system as described in claim 16 wherein said count value of said counter circuit is incremented based upon said variable of said credit signal received by said first upstream communication device from said graphics unit and wherein said count value of said counter circuit is decremented upon input/output data sent to said graphics unit from said external agent.

18. A system as described in claim 13 wherein said counter circuit is initially loaded with a count value equal to the size of said input/output buffer minus the size of said external agent buffer plus an amount to accommodate external agent skid.

19. A system as described in claim 13 wherein said variable of said credit signal has a range of 1 to 255.

20. A system as described in claim 13 wherein said control circuitry further comprises a memory controller.

* * * * *